United States Patent
Teng et al.

(10) Patent No.: US 9,080,296 B2
(45) Date of Patent: Jul. 14, 2015

(54) ALKALI RESISTANT PREFORMED THERMOPLASTIC PAVEMENT MARKING COMPOSITION

(71) Applicant: Ennis-Flint, Thomasville, NC (US)

(72) Inventors: George Ganghua Teng, Greensboro, NC (US); Robert W. Greer, Lexington, NC (US); Simon Yakopson, Hickory, NC (US)

(73) Assignee: Flint Trading, Inc., Thomasville, NC (US)

( * ) Notice: Subject to any disclaimer, the term of this patent is extended or adjusted under 35 U.S.C. 154(b) by 95 days.

(21) Appl. No.: 13/840,634

(22) Filed: Mar. 15, 2013

(65) Prior Publication Data

US 2014/0272331 A1  Sep. 18, 2014

(51) Int. Cl.
| | |
|---|---|
| B41M 5/00 | (2006.01) |
| B44C 1/17 | (2006.01) |
| G03G 7/00 | (2006.01) |
| E01F 9/04 | (2006.01) |
| C04B 41/50 | (2006.01) |
| B32B 7/12 | (2006.01) |
| C04B 41/00 | (2006.01) |
| C08F 222/10 | (2006.01) |
| B32B 27/30 | (2006.01) |
| C09J 123/08 | (2006.01) |

(52) U.S. Cl.
CPC . *E01F 9/041* (2013.01); *B32B 7/12* (2013.01); *B32B 27/306* (2013.01); *C04B 41/0072* (2013.01); *C04B 41/5037* (2013.01); *C04B 41/5041* (2013.01); *C08F 222/10* (2013.01); *C09J 123/0853* (2013.01); *E01F 9/042* (2013.01); *C08L 2666/02* (2013.01); *Y10T 156/10* (2015.01); *Y10T 428/24843* (2015.01); *Y10T 428/24893* (2015.01); *Y10T 428/24909* (2015.01); *Y10T 428/24926* (2015.01)

(58) Field of Classification Search
CPC .... B32B 27/306; B32B 7/12; C04B 41/0072; C04B 41/5037; C04B 41/5041; C08F 222/10; C08L 2666/10; Y10T 428/24893; Y10T 428/24926
USPC .............. 428/195.1, 200, 206, 207, 325, 426, 428/497, 688
See application file for complete search history.

(56) References Cited

U.S. PATENT DOCUMENTS

| | | | |
|---|---|---|---|
| 4,613,632 | A | 9/1986 | Aliani et al. |
| 5,194,113 | A | 3/1993 | Lasch et al. |
| 6,552,110 | B1 | 4/2003 | Yalvac et al. |
| 2002/0115752 | A1* | 8/2002 | Takamura et al. ............... 524/59 |
| 2003/0012599 | A1* | 1/2003 | Wallgren et al. ................ 404/14 |
| 2003/0069358 | A1 | 4/2003 | Helland et al. |
| 2014/0272331 | A1* | 9/2014 | Teng et al. .................... 428/200 |

OTHER PUBLICATIONS

Escorene MV 02514 by ExxonMobil Chemical—SpecialChem4Adhesive (2014).*
Mohs scale of mineral hardness—Wikipedia, the free encyclopedia (2014).*

* cited by examiner

*Primary Examiner* — Betelhem Shewareged
(74) *Attorney, Agent, or Firm* — Guerry L. Grune; ePatent Manager

(57) ABSTRACT

The present disclosure describes a preformed or hot applied thermoplastic marking composition comprising at least 5 weight percent of an ethylene vinyl acetate copolymer, wherein said composition includes a planar top surface portion and a planar bottom portion that are coplanar to each other, wherein said bottom portion is directly applied to an alkaline substrate wherein the alkalinity of said substrate is measured by pH and said pH is greater than 8.0 and wherein said preformed thermoplastic is adhered to said substrate via application of heat or pressure or both heat and pressure and wherein said top surface portion and bottom planar portion comprises an intermix that exists throughout said thermoplastic composition.

10 Claims, 3 Drawing Sheets

ALKALI RESISTANT PREFORMED THERMOPLASTIC PAVEMENT MARKING COMPOSITION

PRIORITY

This application claims the priority of and hereby expressly incorporates by reference, in its entirety, U.S. patent application Ser. No. 12/584,512 filed Sep. 8, 2009, entitled "Retroreflective Pavement Marking with Improved Performance in Wet Night Conditions", and corresponding PCT application of number PCT/US2010/048090 filed Sep. 8, 2010 of the same title; U.S. patent application Ser. No. 12/592,448 filed Nov. 25, 2009, entitled "Composition and System for Preformed Thermoplastic Road Marking With Sequential Features", and corresponding PCT application of number PCT/US2010/057947 filed Nov. 24, 2010 of the same title; and U.S. patent application Ser. No. 12/592,458 filed Nov. 25, 2009, entitled "Preformed Thermoplastic Pavement Marking and Method Utilizing Large Aggregate for Improved Long Term Skid Resistance and Reduced Tire Tracking", and corresponding PCT application of number PCT/US2010/057955 filed Nov. 24, 2010 of the same title

FIELD OF THE INVENTION

The invention herein pertains to thermoplastic pavement marking compositions including the use of ethylene vinyl acetate (EVA) in lieu of polyamide based compositions to improve alkali resistance which is particularly important for providing longer lasting markings and maintaining the integrity of the pattern after application to alkaline substrates such as concrete.

BACKGROUND OF THE INVENTION

Traffic markings convey information to drivers and pedestrians by providing exposed visible, reflective, colored and/or tactile surfaces that serve as indicia. In the past, such a function was typically accomplished by painting a traffic surface. Modern marking materials offer significant advantages over paint such as dramatically increased visibility and/or reflectance, improved durability, and temporary removable marking options. Examples of modern pavement marking materials are thermoplastic, pavement marking sheet materials, tapes and raised pavement markers.

Preformed and hot applied thermoplastic materials used as pavement markings or for other indicia possess many advantages compared to paints and other less durable markings. These materials can be used for years. Known materials using high friction aggregates on the surface to improve friction has been known. The surface applied aggregates provide good initial values, however as the surface is worn due to traffic, the skid resistance decreases. After surface layers containing anti-skid materials become worn out these aggregate materials loose their effectiveness and become slippery because they do not contain high friction particles (of sufficient size to provide good skid properties).

Current thermoplastics include the use of primarily polyamide resins which have been shown to be unstable and often disintegrate in the presence of alkaline (pH of 8 or greater) environments. Certain (often newer) concrete compositions can also often become caustic and more highly alkaline in the presence of moisture after precipitation weather events. Today's thermoplastic materials do not include alkaline resistant properties using ethylene vinyl acetate resins primarily due to the lack of understanding of the affects of alkalinity on long term durability. Preformed thermoplastic decorative patterned materials are currently deteriorating rapidly in the presence of these alkaline environments.

A review of these issues demonstrates the need for thermoplastic products that provide alkali resistance to marking products for installation on road surfaces and also ensures that the integrity of the product (and pattern if so desired) is maintained after installation.

DESCRIPTION OF RELEVANT ART

U.S. Pat. No. 4,613,632 to Aliani, G. and assigned to Exxon Research & Engineering Company, describes ethylene copolymers for hot melt adhesive systems having an ethylene-vinyl acetate copolymer for final hot melt compositions also containing a binder resin and a plasticizer. The hot melt adhesive system is thermoplastic, containing from 5-15% by weight of EVA, but contains a plasticizer unnecessary to the proposed alkali resistant formulation of a preformed thermoplastic.

U.S. Pat. No. 5,194,113 to Lasch, et al., and assigned to Minnesota Mining and Manufacturing Company, describes a process for making a thermoplastic based conformable marking sheet, where the sheet comprises a thermoplastic polymer of 50-85 volume percent selected from a group to include polyamides, and bonding the top surface of the sheet to a top layer comprising a flexible thermoplastic polymer useful as a marking indicium where the flexible thermoplastic polymer to be selected from a group to include ethylene vinyl acetate (EVA). The disclosure provides for a thermoplastic marking applicable to a pavement surface containing a thermoplastic polymer in a high volume percent. A solventless process of embedding particles in thermoplastic pavement marking sheets is disclosed. Processes for preparing marking sheets are also disclosed. Conformant pavement marking sheets which may be applied in cooler conditions are also disclosed.

U.S. Pat. No. 6,552,110 to Yalvac, et al. and jointly assigned to Dow Global Technologies and Nor-Skilt, describes thermoplastic marking compositions. The subject invention pertains to thermoplastic marking compositions comprising a binder, which in turn comprise at least one homogeneous polymer. Accordingly, the subject invention provides a thermoplastic marking composition comprising: (a) from 10 to 80 weight percent of a binder, which in turn comprises: (i) from 1 to 99 weight percent of at least one homogeneous polymer; (ii) from 5 to 70 weight percent of at least one tackifier; (iii) from 0 to 10 weight percent of a polyethylene which has pendant acid functionality moieties of a non-functionalized wax; and (iv) from 0 to 20 weight percent of a plasticizer; and (b) from 20 to 90 weight percent of an inorganic filler. The subject formulations are usefully applied via spray, screed, and extrusion techniques.

US 20030069358 to Helland, et al, and assigned to 3M Innovative Properties Company, describes a thermoplastic composition containing polymeric fibers with a higher melting point than the thermoplastic composition containing it. Features for one embodiment of this invention are a pavement marking composition with synthetic polymeric fibers dispersed in a thermoplastic-based polymeric material, where the synthetic polymeric fibers have a melt point greater than the polymeric material. The fibers are randomly dispersed within the polymeric material. Use in Pavement marking is practical where the polymeric material can be selected from the group comprising alkyd thermoplastic and hydrocarbon thermoplastic. Preferred hydrocarbon thermoplastic materials include acid containing ethylene copolymers, such as ethylene vinyl acetate.

The disclosed review of relevant art shows the need for higher EVA compositions of thermoplastic preforms, therefore providing an alkali-resistant thermoplastic marking specifically in regards to alkaline concrete, efflorescence and wet climates that maintains the integrity of the pattern and a thermoplastic pavement marking composition that includes an increased percentage of an ethylene copolymer, more specifically ethylene vinyl acetate, as a replacement for the typical polyamide polymer

DETAILED DESCRIPTION OF THE DRAWINGS

Figure 1:
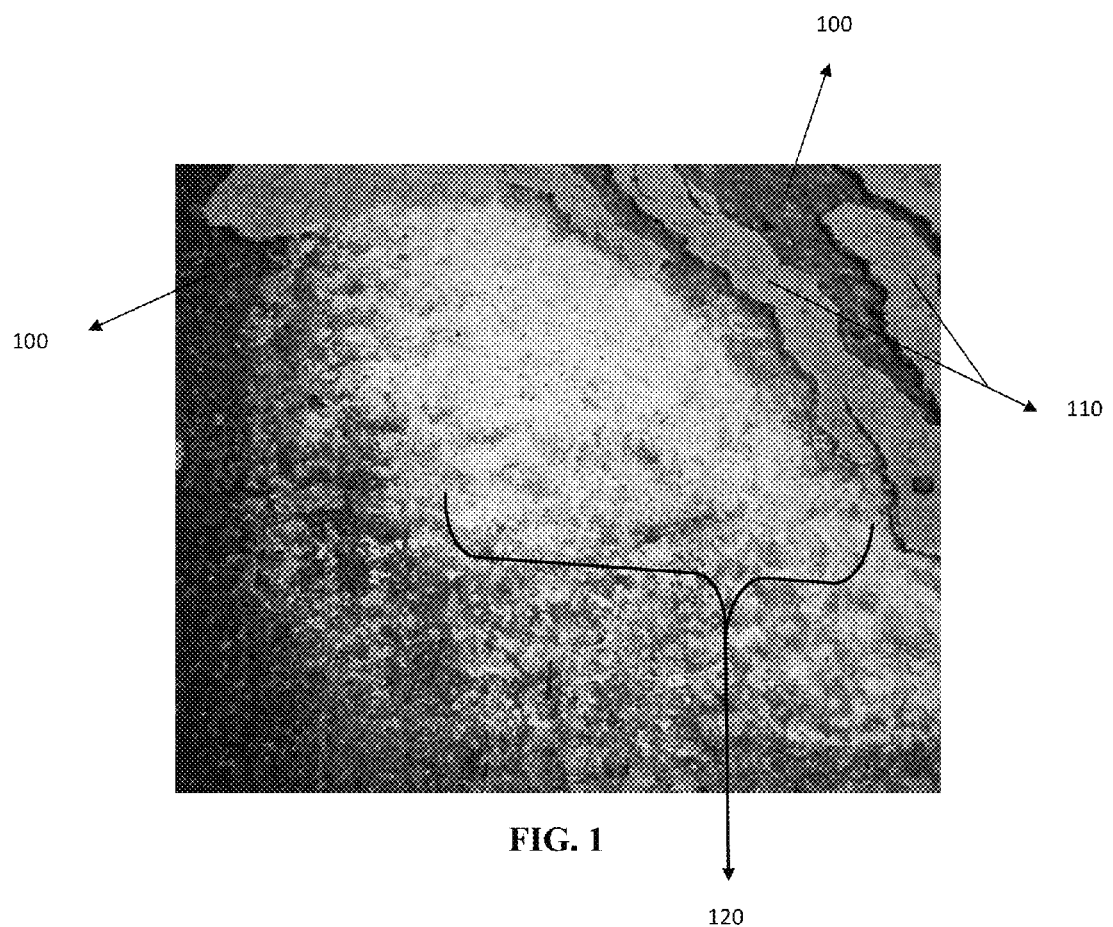
FIG. 1 is a photograph of a fully failed preformed thermoplastic marking, the composition of which is absent the use of ethylene vinyl acetate and has 5-15 weight percent polyamide with the entire coverage area of the preformed marking missing after exposure to high temperature and humidity on a high alkaline concrete substrate in Texas.

FIG. 1 is a photograph of a high alkaline concrete substrate [100] depicting an up-close inspection of a fully failed preformed thermoplastic preformed marking [110], the composition of which is absent the use of ethylene vinyl acetate and has 5-15 weight percent polyamide with the entire coverage area of the preformed marking missing after exposure to high temperature and humidity on a high alkaline concrete substrate in Texas. Concrete efflorescence [120] is present as a reaction by-product due to leaching as a result of alkalinity and humidity associated with the environment of the high alkaline concrete substrate [100].

Figure 2:
FIG. 2 is a photograph of an additional failure with 80 percent of the coverage area of the preformed marking missing after 11 months exposure to high temperature and humidity on a high alkaline concrete substrate in Texas.

FIG. 2 is a photograph of high alkaline concrete substrate [100] depicting an additional failed thermoplastic preformed marking [110] with 80 percent of the coverage area [200] of the preformed marking missing after 11 months exposure to high temperature and humidity on a high alkaline concrete substrate [100] in Texas.

Figure 3:
FIG. 3 is a photograph of an alkali resistant preformed thermoplastic pavement marking with a composition that comprises ethylene vinyl acetate (EVA) and is the subject of the present disclosure. After 11 months exposure to high temperature and humidity on a high alkaline concrete substrate in Texas, the preformed marking is largely in tact with perhaps 5 percent of the coverage area missing in contrast with FIG. 2.

FIG. 3 is a photograph of an alkali resistant preformed thermoplastic pavement marking [300] with a composition that comprises ethylene vinyl acetate (EVA) and is the subject of the present disclosure. After 11 months exposure to high temperature and humidity on a high alkaline concrete substrate [100] in Texas, the preformed marking is largely intact with perhaps 5 percent of the coverage area missing in contrast with FIG. 2.

SUMMARY OF THE INVENTION

The present disclosure describes a preformed thermoplastic pavement marking or hot melt applied material with improved extreme alkali resistance once the pavement marking has been adhered to road surfaces or other solid substrates. The need exists to produce preformed thermoplastic pavement marking materials with improved and extreme alkali resistance, especially for use in wet, humid, and/or hot conditions with concrete for long term use to guard against the aggressive and caustic nature of these concrete substrates to which they are adhered. The preformed thermoplastic material of the present invention is comprised of about 20% binder and 80% "intermix", where the intermix includes inorganic substances such as silica, calcium, and other inorganic pigments.

More specifically, the invention describes a preformed or hot applied thermoplastic marking composition comprising at least 5 weight percent of an ethylene vinyl acetate copolymer, wherein the composition includes a planar top surface portion and a planar bottom portion that are coplanar to each other, wherein the bottom portion is directly applied to an alkaline substrate, the alkalinity of the substrate is measured by pH that is greater than 8.0 and wherein the preformed thermoplastic is adhered to the substrate via application of heat or pressure or both heat and pressure and wherein the top surface portion and bottom planar portion comprises an intermix that exists throughout the thermoplastic composition.

The composition further comprises between 5 and 15 weight percent of a tackifier resin that is a rosin ester, between 2 and 10 weight percent titanium dioxide and an organic dye, and at least 60 weight percent intermix, wherein the intermix is an inorganic filler. In addition, the ethylene vinyl acetate copolymer further comprises at least 9 and more preferably 18.7 weight percent vinyl acetate monomer. The intermix is at least 60 weight percent of said total marking composition and comprises calcium carbonate, glass beads, fumed silica, and aggregate.

There is a strong need in the industry to provide a preformed thermoplastic so that these marking surfaces remain alkali and caustic resistant and can be used for any application. In order to achieve this desired result, the alkali resistant preformed road marking compositions must include relatively high levels of ethylene vinyl acetate (EVA) polymer, specifically in the range of 5 to 15 weight percent of the total composition in comparison with the currently used compositions where the EVA is often not used at all or at most used as an additive at about 1 weight percent in the total composition.

DETAILED DESCRIPTION

To achieve the desired alkali resistance, replacement of fatty acid dimer based polyamide resins such as Uni-Rez 2633 from Arizona Chemical is required. Direct replacement can be costly but effective, however, often additional stabilizers and plasticizers are also needed in the final composition to endure the longer term flexibility and stability demands on preformed thermoplastic pavement markings. For example, Escorene Ultra AD2528® and Escorene Ultra UL7510® are both such vinyl acetate copolymers provide by Exxon-Mobile Corporation which can be used as a major component in the preferred hot melt adhesive. One preferred hot melt adhesive is formulated with the AD 2528 as well as ester modified rosins, fillers, extenders, levelers and other conventional components.

The general alkali resistant formulation generally comprises a tackifier resin (5-15 weight percent), an ethylene vinyl acetate (EVA) polymer, pigment (2-10 weight percent) that is normally titanium dioxide with or without an organic ye (depending on the desired color) and 60-80 weight percent of a filler that is calcium carbonate, glass beads, funed silica, and aggregate.

Common test methods for measuring the effectiveness of these pavement markings for alkali resistance include BS EN 1871:2000 and also includes methods for testing heat stability, cold impact, softening point, indentation, and wear resistance. All of these parameters are important in finalizing compositions which meet the needs of the alkaline concrete environments that are the subject of the present disclosure.

It has also been shown that it is possible to use single grit size aggregate in the intermix. The use of an intermix of different grit sized aggregates in different proportions based on the need for the future use of different materials (larger sizes for thicker and larger thermoplastic sheets and smaller aggregates for narrow strips) is also part of the present disclosure.

In the present invention, the use of uniform particulate material or blends of particulate materials for the aggregate with differing hardness values, providing more economical solutions, can be introduced into the intermix during formulation. The introduction of these blends usually occurs prior to extrusion and completion of the thermoplastic pavement marking. The aggregates and other particles such as glass beads and the inorganic choices stated above can also, however, be dropped on the hot material during installation and completely embedded into body of the thermoplastic marking material in that fashion. The preformed thermoplastic surface marking product can be applied using pressure sensitive adhesives as well as by flame torching.

In addition, in recent years increasing numbers of municipalities, office complexes, shopping centers and other commercial developments have utilized thermoplastic pavement markings with various patterns and designs to guide, decorate, and protect high traffic areas such as highways, pedestrian crosswalks, parking lots and business entrances. Such patterns may include a first section or grid, for example to represent the mortar joints in a "brick" design and a plurality of second sections or "bricks" which are coplanar therewith, usually in a color different from the mortar color. The second section or bricks which are separately manufactured are inserted into the first section or grid before application of the pattern to the pavement. Various two section marking patterns are commonly available such as: herringbone, standard brick, cobblestone, paving slabs and many other designs. Marking patterns with more than two sections are also commonly available such as horizontal highway and street signage, logos and many others.

As hereinbefore mentioned, these marking patterns consist of two or more independent sections which must be carefully assembled and handled before applying to pavements such as asphalt, concrete or other suitable substrates. These marking patterns are placed at desired locations such as road crosswalks, intersections, parking lots or other sites. In some cases heat is then applied to soften the pavement marking pattern causing it to firmly adhere to the substrate. Various adhesives can also be used to adhere the marking pattern to the substrate.

While the purchase of such pavement marking patterns is relatively inexpensive, much time and labor is devoted to the assembly and application of the pattern to the substrate. Most patterns consist of two or more sections which are independently formed for manual assembly at the job site and time and effort is needed to assemble and maintain the integrity of a pattern before the heat treatment. Usually the pattern placed on the substrate must be moved manually for adjustment purposes. During such movement, the independent sections in the pattern inadvertently become unaligned, requiring reinsertion or realignment. If the realignment is not precisely accomplished, the marking pattern will have lost its integrity and the entire pattern must be removed manually from the substrate, the substrate cleaned and a second attempt at the application made with the reinserted or new marking pattern. This re-application results in extra time, labor, and materials.

In the past, to maintain the integrity of the marking pattern before the heat treatment and during the handling and placement, "spot adhesives" have been used which remain somewhat "tacky" after being applied to the bottom of the patterns at the grid intersections to maintain pattern integrity. However, these small adhesive circles or "spots" are generally a different type of polymer than the marking pattern and can prevent proper attachment and easy movement of the marking pattern on the substrate at the spot adhesive locations before and during the heat application of the marking. Also, certain spot adhesives are not compatible with the plastic materials from which the patterns are formed and can cause the pavement marking sections to separate from the substrate after the heat application, as only a weak bond is formed with the substrate.

The above stated objectives are realized by providing a conventional pavement marking pattern formed of a thermosetting or thermoplastic which may have two or more sections, manually joined by bridging the bottom surface thereof with an adhesive having substantially the same temperature softening point as the sections of the marking pattern. The adhesive can be sprayed primarily along the intersections of the pattern to cover a percentage (approximately from 5% to 90%) of the patterned bottom surface area while bridging the intersections. The more intricate the pattern (with more joints or intersections) the greater the percentage of adhesive coverage required. The spray adhesive can be a typical polyamide, EVA based hot melt adhesive or other, such as styrene-isoprene-styrene copolymers, styrene-butadiene-styrene copolymers, ethylene ethyl acrylate copolymers, and polyurethane reactive, and preferably for the purposes of this disclosure consists of a hot melt EVA resin based adhesive which is sprayed in a circular or spiral string like configuration at a temperature at or above its softening point. The sprayed hot adhesive strikes the marking pattern and adheres, bridging and bonding the pattern sections to maintain pattern integrity during subsequent handling. In a typical manufacturing process, various sections of a pavement marking pattern (e.g. a brick and mortar pattern or any other desired pattern) are factory assembled and while in assembled form, the bottom of the pattern is sprayed with the hot melt adhesive described above using preferably spray gun model: Hysol-175-spray as manufactured by Loctite Corporation of 1001 Tout Brook Crossing, Rocky Hill, Conn. 06067, having various pressures and nozzle settings to select from, depending on the viscosity of the particular adhesive employed. A circular or spiral string-like adhesive configuration is preferred for the spray.

Once the sprayed hot melt adhesive has cooled, the grid and inserts are suitably bridged and joined and the pavement marking pattern is packaged for shipment. Upon receipt at the job site, the packages are opened and after the intended substrate, usually asphalt or concrete is properly cleaned and swept, the marking pattern is then placed on the substrate without concern of disassembly during handling, movement and adjustment. Once suitably placed, a heat application is delivered from a conventional source which softens the marking pattern and the underlying sprayed adhesive, both of which have the approximate same temperature softening point to thereby affix the pavement marking pattern to the substrate. Time and labor are thereby saved as the marking pattern sections have been adhered to form a unified pattern by the hot melt adhesive.

Among additional objectives of the invention include providing a relatively inexpensive pavement marking pattern having two or more sections in which the sections are joined by use of an applied alkaline resistant adhesive and to provide a method for forming a pavement marking pattern which allows cost efficient factory assembly of the pattern and which prevents dislodging and separation of the pattern sections during handling, transportation and application.

Other objects of the invention are to provide an adhesive which can be conveniently sprayed onto the back of pavement marking patterns which will sufficiently adhere thereto and prevent separation of the sections during handling, and not deteriorate the bond between the pavement marking pattern and the substrate and to provide a method for easy application of the adhesively sprayed marking pattern to the substrate.

It should be understood that although examples are given it should not be construed that these are examples provide the only examples of the invention and that variations of the present invention are possible, while adhering to the inventive concept herein disclosed.

WORKING AND COMPARATIVE EXAMPLES

Test Methodology

FIGS. 1, 2, and 3 provide photographs of actually tests conducted in the file don concrete surfaces in Texas over a time period of 11 months. It is clear that the test is to determine visual differences that occure for the preformed thermoplastic markings on actual road surfaces over time. The only formulation which passed the visual indication test (less than 5 percent of the area coverage missing after 11 month)—as shown in FIG. 3, was as follows;

Working Example 1

An example of the EVA resin composition for the preformed thermoplastic of the present invention is provided as follows:

| Material composition by weight percent | |
|---|---|
| Rosin Ester, Sylvilite RE100, Arizona Chemical | 15% |
| EVA, Escorene Ultra AD 2528 | 13% |
| AASHTO Glass Beads Type 1 | 30% |
| Calcium carbonate | 21% |
| Titanium dioxide (Rutile) - | 10% |
| Sand/Quartz grit 50 | 11% |

Using a Flint-2000 propane torch, the material composition was applied on two square cement boards (20 inches by 20 inches).

Comparative Example 1

As an illustration, Comparative Example 1 uses polyamide resin with the intermix.

| Material Composition for Comparative Example 1 | |
|---|---|
| Polyamide resin Uni-Rez 2633 - | 7.5% |
| Modified rosin resin Sylvacote 4981 - | 8.5% |
| Phthalate plasticizer - | 3.0% |
| PE based wax - | 2.0% |
| Fumed silica - | 0.5% |
| Corundum grit 30 | 18.5% |
| $TiO_2$ | 10% |
| $CaCO_3$ | 20% |
| AASHTO Glass Beads Type 1 | 30% |

Although the invention has been described in considerable detail with reference to certain preferred versions thereof; other versions are possible. For example, the coating compositions can include one or more ingredients that enhance other film properties such as gloss, etc. Therefore, the spirit and scope of the claims should not necessarily be limited to the description of the preferred embodiments contained herein.

What is claimed is:

1. A preformed or hot applied thermoplastic marking composition comprising at least 5 weight percent of an ethylene vinyl acetate copolymer wherein said ethylene vinyl acetate copolymer further comprises at least 18.7 weight percent vinyl acetate monomer and wherein said composition includes a planar top surface portion and a planar bottom portion that are coplanar to each other, wherein said bottom portion is directly applied to an alkaline substrate wherein the alkalinity of said substrate is measured by pH and said pH is greater than 8.0 and wherein said preformed thermoplastic is adhered to said substrate via application of heat or pressure or both heat and pressure and wherein said top surface portion and bottom planar portion comprises an intermix that exists throughout said thermoplastic composition and wherein said composition further comprises between 5 and 15 weight percent of a tackifier resin that is a rosin ester, between 2 and 10 weight percent titanium dioxide and an organic dye, and at least 60 weight percent intermix, wherein said intermix is an inorganic filler.

2. The preformed or hot applied thermoplastic composition of claim 1, wherein said intermix is at least 60 weight percent of said total marking composition and wherein said intermix comprises calcium carbonate, glass beads, fumed silica, and aggregate.

3. The preformed or hot applied thermoplastic composition of claim 1, wherein said intermix is at least 80 weight percent of said total marking composition and wherein said intermix comprises calcium carbonate, glass beads, fumed silica, and aggregate.

4. The preformed or hot applied thermoplastic composition of claim 3, wherein said aggregate comprises quartz, granite, corundum, calcined clay, metal slag or any combination of said quartz, granite, corundum, calcined clay, or metal slag.

5. The preformed or hot applied thermoplastic composition of claim 3, wherein said aggregate measures greater than 6 on the Mohs Hardness Scale.

6. The preformed or hot applied thermoplastic composition of claim 1, wherein more than one top surface and bottom portion of said preformed thermoplastic marking utilizes an adhesive for bonding and interlocking one section of a preform to another section of said preform so that more than one section of said preform can be bonded to another section of said preform, thereby providing a patterned preformed thermoplastic road marking.

7. The preformed or hot applied thermoplastic composition of claim 6, wherein said top surface portion includes patterned markings, wherein said patterned markings are lines, legends, arrows, indicia, including colored surfaces and sections of said surfaces other than or together with a white color.

8. The adhesive of claim 6, wherein said adhesive is sprayable and alkaline resistant, allowing for bridging an intersection on the planar bottom surfaces of a grid section and an insert section such that said grid and insert section form a unified pavement marking pattern and wherein said adhesive includes an ethylene vinyl acetate (EVA) based hot melt adhesive.

9. The adhesive of claim 6, wherein said adhesive has a softening point in a range of 90 degrees centigrade to about 210 degrees Centigrade.

10. The adhesive of claim 6, wherein said adhesive comprises an alkaline resistant thermosetting adhesive.

* * * * *